(12) United States Patent
Jiang et al.

(10) Patent No.: US 11,868,326 B2
(45) Date of Patent: *Jan. 9, 2024

(54) HYPERPARAMETER TUNING IN A DATABASE ENVIRONMENT

(71) Applicant: SNOWFLAKE INC., Bozeman, MT (US)

(72) Inventors: Boxin Jiang, Sunnyvale, CA (US); Qiming Jiang, Redmond, WA (US)

(73) Assignee: Snowflake Inc., Bozeman, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/074,830

(22) Filed: Dec. 5, 2022

(65) Prior Publication Data

US 2023/0136738 A1    May 4, 2023

Related U.S. Application Data

(63) Continuation of application No. 17/514,216, filed on Oct. 29, 2021, now Pat. No. 11,561,946.

(51) Int. Cl.
| | | |
|---|---|---|
| *G06F 16/00* | (2019.01) | |
| *G06F 16/21* | (2019.01) | |
| *G06F 16/2458* | (2019.01) | |
| *G06F 16/242* | (2019.01) | |
| *G06N 3/08* | (2023.01) | |

(52) U.S. Cl.
CPC ........ *G06F 16/217* (2019.01); *G06F 16/2433* (2019.01); *G06F 16/2474* (2019.01); *G06N 3/08* (2013.01)

(58) Field of Classification Search
CPC ............... G06F 16/217; G06F 16/2433; G06F 16/2474; G06N 3/08
USPC ......................................................... 707/713
See application file for complete search history.

(56) References Cited

U.S. PATENT DOCUMENTS

| | | |
|---|---|---|
| 10,387,900 B2 | 8/2019 | Bledsoe et al. |
| 10,417,556 B1 | 9/2019 | Fairbank et al. |
| 10,936,947 B1 | 3/2021 | Flunkert et al. |
| 11,561,946 B1 | 1/2023 | Jiang et al. |
| 2018/0300737 A1 | 10/2018 | Bledsoe et al. |
| 2020/0089781 A1 | 3/2020 | Jayaraman et al. |
| 2021/0056609 A1 | 2/2021 | Mane et al. |
| 2021/0397975 A1 | 12/2021 | Al-Omari et al. |
| 2022/0383150 A1* | 12/2022 | Le ........................... G06N 5/04 |

* cited by examiner

*Primary Examiner* — Vincent F Boccio
(74) *Attorney, Agent, or Firm* — Womble Bond Dickinson (US) LLP

(57) ABSTRACT

An example method of tuning a machine learning operation can include receiving a data query comprising a reference to an input data set of a database, generating a plurality of unique sets of hyperparameters by varying a hyperparameter value of each set of hyperparameters of the plurality of unique sets of hyperparameters based on the input data set, in response to receiving the data query, training a plurality of machine learning models using the input data set of the data query, each of the plurality of machine learning models configured according to a respective one of a plurality of unique sets of hyperparameters, selecting a first machine learning model of the plurality of machine learning models based on an accuracy of an output of the first machine learning model, and returning the output of the first machine learning model in response to the data query.

20 Claims, 12 Drawing Sheets

HYPERPARAMETER TUNING IN A DATABASE ENVIRONMENT

CROSS REFERENCE TO RELATED APPLICATION

This application is a continuation of U.S. patent application Ser. No. 17/514,216, entitled "HYPERPARAMETER TUNING IN A DATABASE ENVIRONMENT," filed on Oct. 29, 2021, the disclosure of which is incorporated herein by reference in its entirety.

TECHNICAL FIELD

The present disclosure relates to database operations and, in particular, to tuning of machine learning operations associated with database data.

BACKGROUND

Databases are widely used for data storage and access in computing applications. Databases may include one or more tables that include or reference data that can be joined, read, modified, or deleted using queries. Databases can store small or extremely large sets of data within one or more tables. This data can be accessed by various users in an organization or even be used to service public users, such as via a website or an application program interface (API). The large amount of data that can be contained within a database can often be useful for various types of data analytics, which involves the attempt to determine conclusions and/or predictions based on analysis of the information contained in the data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

In the systems and methods described herein, a data storage system utilizes a SQL (Structured Query Language)-based relational database. However, these systems and methods are applicable to any type of folder using any data storage architecture and using any language to store and retrieve data within the database. The systems and methods described herein further provide a mechanism for performing an analysis of data held within a database based on a machine learning model. Further embodiments provide a mechanism to automatically tune hyperparameters of the machine learning model by utilizing operational components of the database structure. In some embodiments, the analysis may be generated by a SQL user-defined table function (UDTF) exposed by the database.

Machine learning has been increasingly used to perform analysis and prediction on large amounts of data. Machine learning consists, in part, of generating a machine learning model by performing large numbers of comparisons on training sets of data while varying elements of the machine learning model to better refine the results of the comparisons. Machine learning models incorporate hyperparameters and parameters. The parameters of the machine learning model are elements (e.g., weights) of the model that are varied as part of the machine learning process (e.g., during training of the machine learning model). Hyperparameters are elements that are associated with the structure/operation of the machine learning model itself. Hyperparameter tuning is the process of searching for satisfactory and/or optimal values for a set of parameters in machine learning training algorithms.

Some embodiments herein describe systems and methods that utilize the architecture of a database to distribute hyperparameter tuning operations on multiple compute nodes to increase and/or maximize parallelization and reduce overall latency. In some embodiments, extensibility features of the database architecture, such as the ability to call functions and operations, can leveraged to run machine learning operations as well as machine learning training algorithms within the database architecture. In some embodiments, database functionality, such as a UDTF, may be utilized to access the data distribution of the database and make the hyperparameter tuning operation accessible to a client from within the database (e.g., via a SQL statement/query).

The embodiments described herein may reduce and/or minimize the data exchange between compute nodes and ensure and/or improve an even distribution of work across compute nodes of a database architecture for typical machine learning hyperparameter search workloads, without the need for determining the distribution strategy (e.g., in advance).

Figure 1:
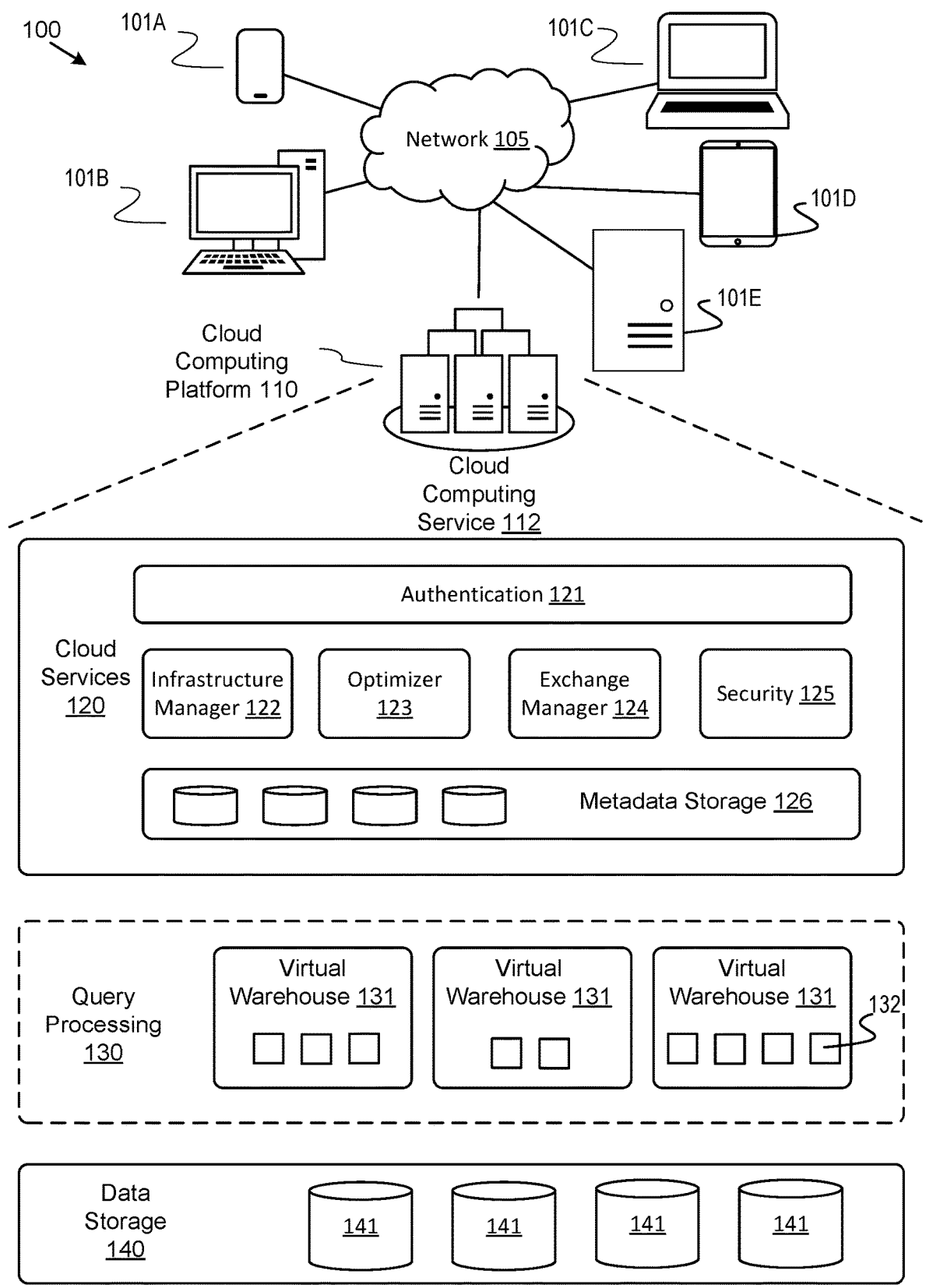
FIG. 1 is a block diagram depicting an example computing environment in which the methods disclosed herein may be implemented.

FIG. 1 is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™ or GOOGLE CLOUD PLATFORM™, or the like. As known in the art, a cloud computing platform 110 provides computing resources and storage resources that may be acquired (purchased) or leased and configured to execute applications and store data. The cloud computing platform 110 may be accessed by a client 101 (e.g., a client device). Non-limiting examples of client devices include a smart phone 101A, personal computer 101B, laptop 101C, tablet computer 101D, server computer 101E, and/or another type of device that can process data.

FIG. 1 and the other figures may use like reference numerals to identify like elements. A letter after a reference numeral, such as "101A," indicates that the text refers specifically to the element having that particular reference numeral. A reference numeral in the text without a following letter, such as "101," refers to any or all of the elements in the figures bearing that reference numeral.

In some embodiments, client devices 101 may access the cloud computing platform 110 over a network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WIFI® hotspot connected with the network 105 and/or a wireless carrier system that can be implemented using various data processing equipment, communication towers (e.g., cell towers), etc. The network 105 may carry communications (e.g., data, message, packets, frames, etc.) between the various components of the cloud computing platform 110 and one more of the client devices 101.

The cloud computing platform 110 may host a cloud computing service 112 that facilitates storage of data on the cloud computing platform 110 (e.g., data management and access) and analysis functions (e.g., SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution by compute nodes within elastic clusters of virtual machines, referred to herein as virtual warehouses or data warehouses. Thus, query processing 130 may include one or more virtual warehouses 131 having one or more compute nodes 132, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse 131 that expands, contracts, or shuts down according to the user's needs. Expanding a virtual warehouse 131 involves generating one or more compute nodes 132 to the virtual warehouse 131. Contracting a virtual warehouse 131 involves removing one or more compute nodes 132 from the virtual warehouse 131. More compute nodes 132 may lead to faster compute times. For example, a data load which takes fifteen hours on a system with four nodes might take only two hours with thirty-two nodes.

Cloud services 120 may be a collection of services (e.g., computer instruction executing on a processing device) that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

In one embodiment, the cloud computing service 112 can perform a machine learning operation on contents of the data in a data set of the cloud computing platform 110. In some embodiments, the machine learning operation may include tuning one or more hyperparameters of the underlying machine learning model. In some embodiments, an instantiation of the machine learning operation may be performed responsive to a command from a client 101 of the cloud computing service 112, such as via a SQL statement. Additionally, the cloud computing service 112 may generate an output data set of the machine learning operation.

Figure 2A:
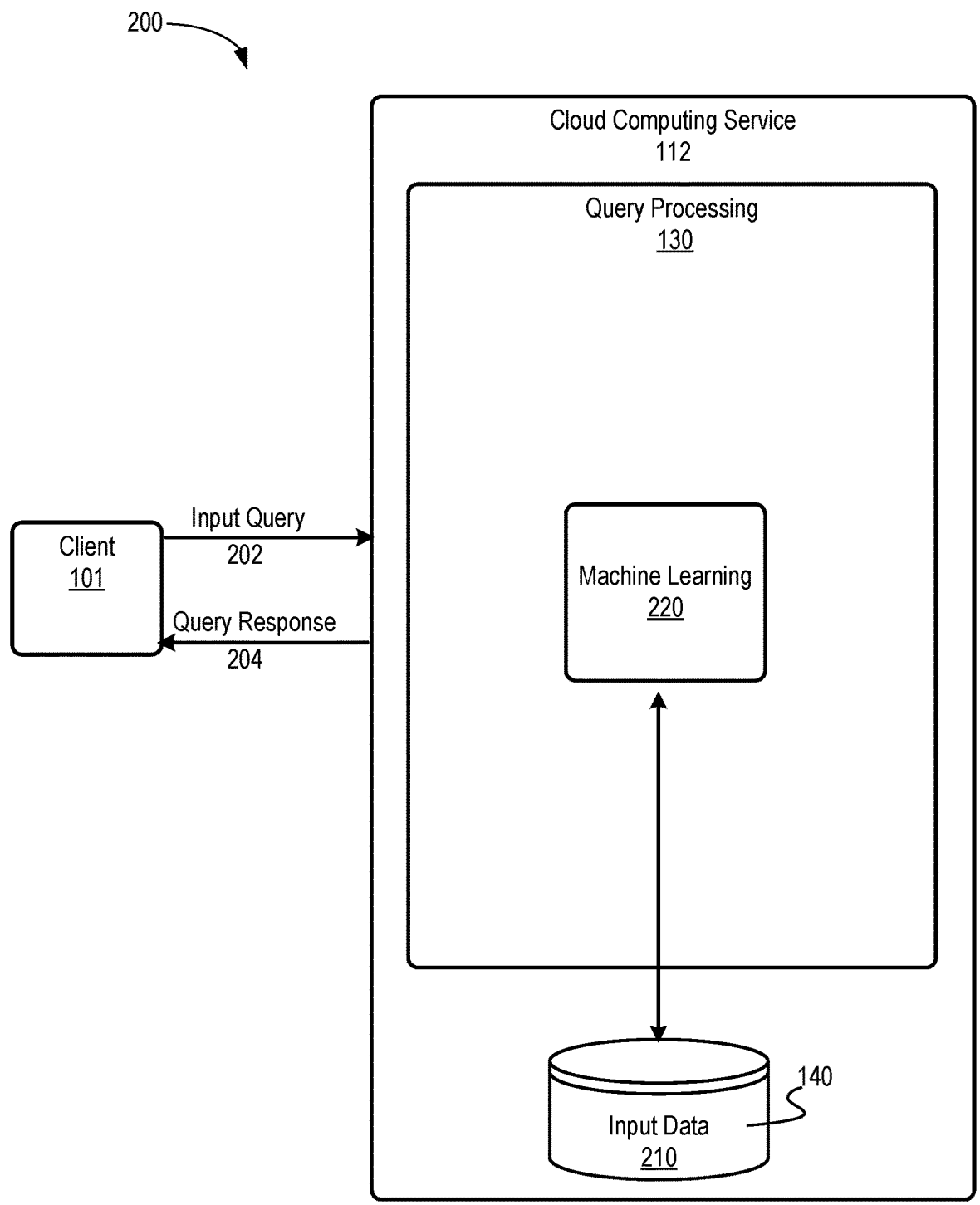
FIGS. 2A and 2B are schematic block diagrams of example embodiments of performing a machine learning operation on an input data set, in accordance with some embodiments of the present disclosure.
Figure 2B:
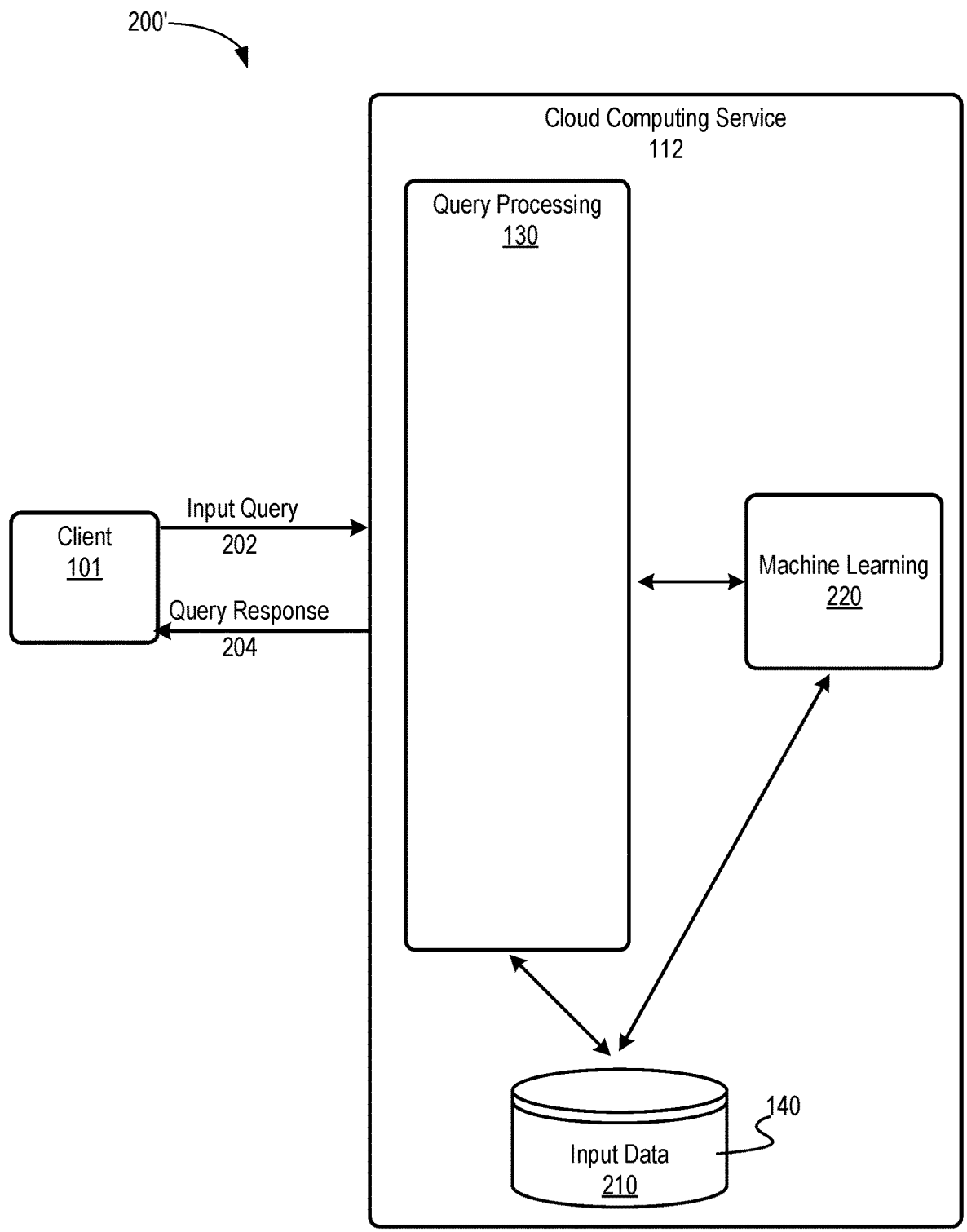

FIGS. 2A and 2B are schematic block diagrams of example embodiments of performing a machine learning operation on an input data set, in accordance with some embodiments of the present disclosure. In FIG. 2A, system 200 includes a query processing component 130 of a cloud computing service 112 that receives an input query 202, performs a machine learning operation 220 on input data 210 referenced by the input query 202, and returns query response 204.

In one embodiment, the input data 210 of the input query 202 can be any type of data set stored in columns or can be converted into columnar data (e.g., JavaScript Object Notation, key-value data, and/or other types of stored data). In some embodiments, the input query 202 may reference the input data 210 stored in the data storage 140 of the cloud computing service 112, such as within the cloud computing platform 110 described in FIG. 1 above.

In some embodiments, the input query 202 may be a command/request provided by a client device 101. For example, the client device 101 may be a personal computer, laptop, server, tablet, smart phone, and/or another type of device that can process data and/or communicate with the cloud computing service 112. The input query 202 may provide a reference to the input data 210, such as by a SQL query, and may request that the cloud computing service 112 perform the machine learning operation 220 on the input data 210. The results of the machine learning operation 220 may be provided to the client 101 as part of the query response 204.

FIG. 2A illustrates that the machine learning operation 220 may be performed as part of the query processing infrastructure 130. However, the embodiments of the present disclosure are not limited to such an implementation. In some embodiments, the machine learning operation 220 may be performed by an external service or device. For example, FIG. 2B illustrates a system 200' in which the query processing 130 invokes a call to services within the cloud computing service 112 that execute the machine learning operation 220. For example, in some embodiments, the machine learning operation 220 may be performed by a JAVA® environment and/or service that is invoked by the query processing 130.

When operated as an external service, the machine learning operation 220 may have access to the input data 210 from the data storage 140 and/or may provide the input data 210 by way of the call from the query processing 130. After performing the machine learning operation 220, the results may be provided to the query processing 130, which may return them as part of the query response 204.

The systems 200, 200' of FIGS. 2A and 2B may provide a mechanism by which database data, such as input data 210 of data storage 140 may be processed as part of a machine learning operation 220. The machine learning operation 220 may allow for various analyses to be performed on the input data 210 without requiring that the data be exported. Avoiding the data exportation may reduce the need for resources to perform the machine learning and may make data governance easier. In addition, the use of the machine learning operation 220 within the cloud computer service 112 may allow for the machine learning operation 220 to be performed utilizing standard database queries that may abstract the complexity of the machine learning operation 220 from the client 101. In addition, the machine learning operation 220 may be able to provide its results in a standard format that can be easily accessed, parsed, and incorporated into other database queries. As will be discussed further herein, some embodiments of the machine learning operation 220 may allow for the input data 210 to be provided as SQL references to standard database tables, and the results can be similarly provided as a database table and/or view.

Figure 3:
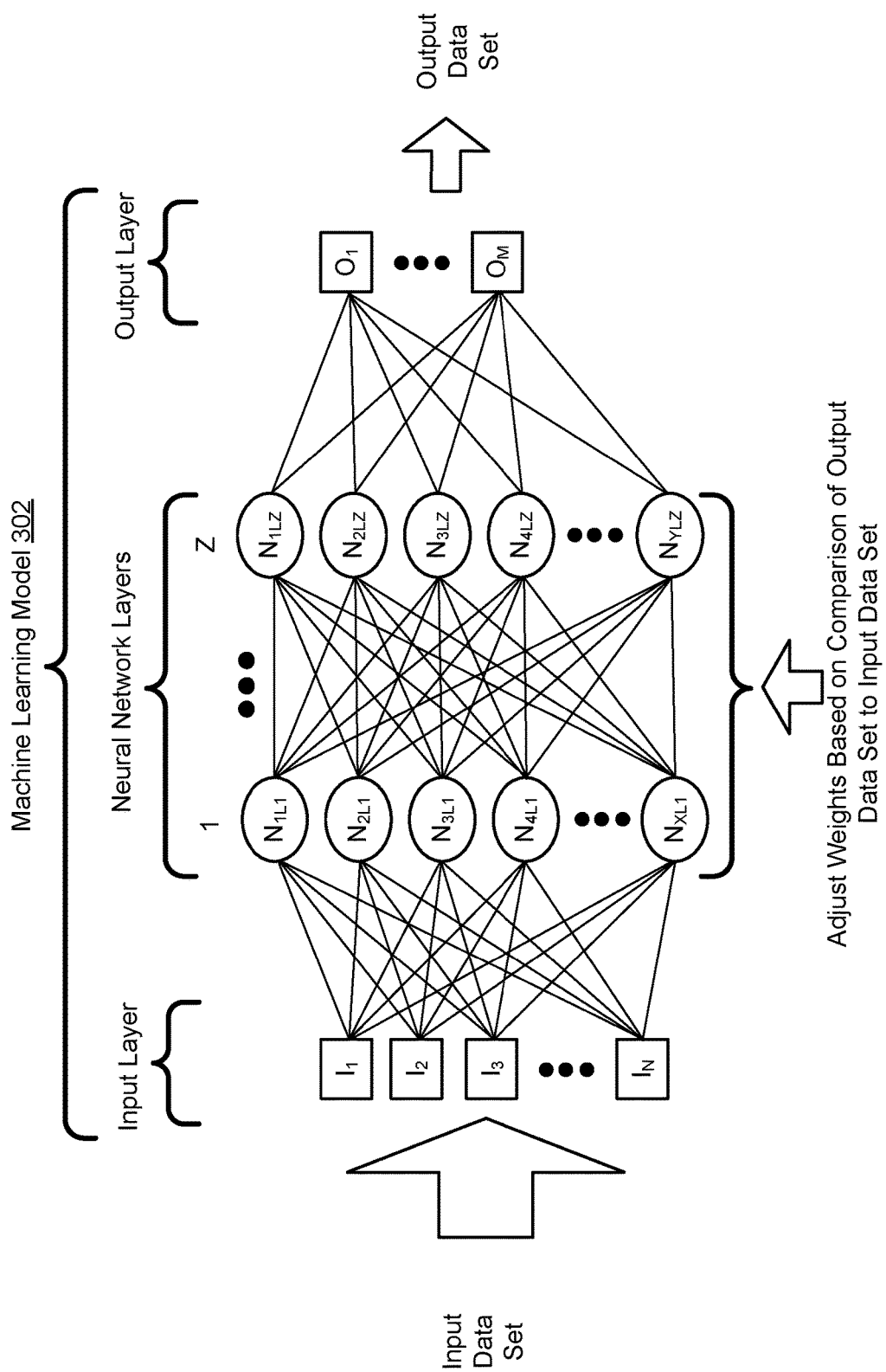
FIG. 3 is a block diagram of a machine learning model that can be used in a computer system to perform a machine learning operation on database data, in accordance with some embodiments of the present disclosure.

FIG. 3 is a block diagram of a machine learning model 302 that can be used in a computer system to perform a machine learning operation on database data, in accordance with some embodiments of the present disclosure. The machine learning model 302 may be utilized, for example, to perform the machine learning operation 220 described with respect to FIGS. 2A and 2B.

Referring to FIG. 3, the machine learning model 302 includes an input layer having a plurality of input nodes $I_1$ to $I_N$, a sequence of neural network layers (layers 1 to Z are illustrated in FIG. 3) each including a plurality (e.g., 1 to X in FIG. 3) of weight nodes, and an output layer including at least one output node. In the particular non-limiting example of FIG. 3, the input layer includes input nodes $I_1$ to $I_N$ (where N is any plural integer). A first one of the sequence of neural network layers includes weight nodes $N_{1L1}$ (where "1L1" refers to a first weight node on layer one) to $N_{XL1}$ (where X is any plural integer). A last one ("Z") of the sequence of neural network layers includes weight nodes $N_{1LZ}$ (where Z is any plural integer) to $N_{YLZ}$ (where Y is any plural integer). The output layer includes a plurality of output nodes $O_1$ to $O_M$ (where M is any plural integer).

The machine learning model 302 can be operated to process a plurality of data from an input data set through different inputs (e.g., input nodes $I_1$ to $I_N$) to generate one or more outputs (e.g., output nodes $O_1$ to $O_M$). The elements of the input data set that can be simultaneously processed through different input nodes $I_1$ to $I_N$ may include, for example, data from rows and/or columns of the input data 210 referenced by the input query 202 (see FIGS. 2A and 2B). The output data set that can be output (e.g., through output nodes $O_1$ to $O_M$) may include analyses based on the input data set. For example, the output data set may include predictions based on the input data set and/or classifications of the input data set, as determined by the machine learning model 302.

During training of machine learning model 302, the various weights of the neural network layers may be adjusted based on a comparison of a predicted output data set to training data provided to the machine learning model 302. The comparison may be performed, for example, through the use of a loss function. The loss function may provide a mechanism to calculate how poorly the training model is performing by comparing what the model is predicting with the actual value it is supposed to output. The interconnected structure between the input nodes, the weight nodes of the neural network layers, and the output nodes may cause a given input data from the input data set to influence the output data set that is generated for all of the other input data that are simultaneously processed. The output data set generated by the machine learning model 302 may thereby identify a comparative prioritization of which of the input data set provide a higher/lower impact on the output data set.

Once trained, the machine learning model 302 may be operated based on the weights of the weight nodes determined during the training. The machine learning model 302 may be operated according to the trained values to generate an output data set for a given input data set.

The machine learning model 302 of FIG. 3 is an example that has been provided for ease of illustration and explanation of one embodiment. Other embodiments may include any non-zero number of input layers having any non-zero number of input nodes, any non-zero number of neural network layers having a plural number of weight nodes, and any non-zero number of output layers having any non-zero number of output nodes. The number of input nodes can be selected based on the number of input values that are to be simultaneously processed, and the number of output nodes can be similarly selected based on the number of output characteristics that are to be simultaneously generated therefrom.

The number of input layers, input nodes, neural network layers, weight nodes, output nodes, and/or output layers are all examples of hyperparameters of the machine learning model 302. Adjusting these hyperparameters can have an impact on the accuracy of the machine learning model 302. As will be discussed further herein, the hyperparameters may be tuned in some embodiments to improve the overall accuracy of the machine learning model 302.

Referring back to FIGS. 2A and 2B, the machine learning operation 220 can perform a plurality of different types of analyses on the input data 210 referenced by the input query 202. For example, the input data 210 may refer to a series of columns and/or rows of a database table. The data entries in the columns and/or rows may be provided as input data to the machine learning operation 220 (e.g., provided to the input nodes of the machine learning model 302 illustrated in FIG. 3). In some embodiments, the input data 210 may include data referenced by the input query 202 of the client device 101 as well as additional data available within the cloud computing service 112.

One example of a machine learning operation 220 includes time series forecasting. Time series forecasting may provide a prediction for how a given data value will vary over time, given an initial set of data describing the variation of the data value over a known interval. Time series analysis may account for the fact that data points taken over time may have an internal structure (such as autocorrelation, trend or seasonal variation) that may be accounted for. The machine learning operation 220 may provide analysis that predicts this internal structure. In some embodiments, the time series forecasting is univariate, in which the data value itself is the primary element changing over time. In some embodiments, the time series forecasting is multivariate, in which multiple data values are changing over time.

With time series forecasting, the input query 202 may provide a reference to input data 210 that may include a series of data within the data storage 140 (e.g., a reference to one or more rows/columns of the database). The machine learning operation 220 may provide the input data 210 to an input of a machine learning model (e.g., machine learning model 302 of FIG. 3) to determine an underlying algorithm that is capable of predicting future values of the data. The predictions of the underlying algorithm may be capable of detecting and accounting for, for example, a seasonality pattern (e.g., the machine learning operation may automatically detect periodic patterns such as a weekly pattern, a quarterly pattern, etc.), confidence intervals in its predictions (e.g., provide x % confidence interval for each forecasting result), trends (e.g., automatically detect trends such as a linear trend, polynomial trend, exponential trend, etc.), multiplicative vs. additive impacts on the input data (e.g., automatically determine if a time series is formed by components multiplied together or added together, where the components may include "seasonality," "trend," and "error/residual/noise"), holiday impacts (e.g., include knowledge of common holidays and detect/apply special holiday effects on the time series forecasting), and other types of variables and/or characteristics that may impact the time series forecasting.

Figure 4:
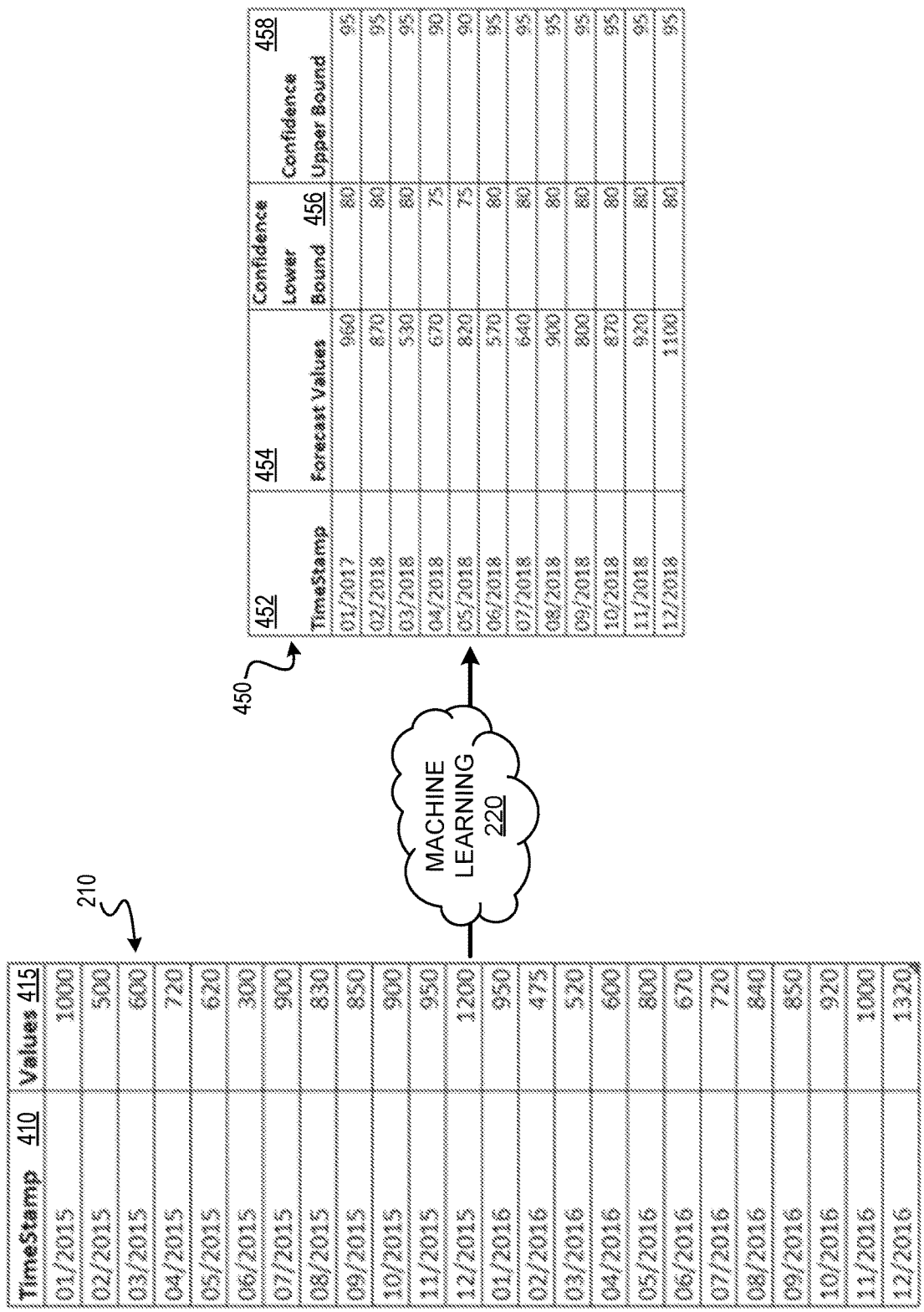
FIG. 4 is an example of input data and the resulting output data that may be generated by time series forecasting performed by a machine learning operation, in accordance with some embodiments of the present disclosure.

FIG. 4 is an example of input data 210 and the resulting output data 450 that may be generated by time series forecasting performed by the machine learning operation 220, in accordance with some embodiments of the present disclosure. Referring to FIGS. 2A, 2B, 3, and 4, embodiments of the present disclosure may provide input data 210 as part of an input query 202. The input query 202 may provide a reference to the input data 210 within the cloud computing service 112. For example, the input query 202 may be provided as a SQL statement that includes a reference to one or more rows/columns of a database.

In FIG. 4, the input data 210 includes two columns, a timestamp column 410 and a values column 415. The input data 210 may represent, for example, a series of values (values column 415) that are respectively associated with a series of timestamps (timestamp column 410). For example, each of the rows of the input data 210 may represent a volume of sales (value) for a particular month (timestamp), though this is merely an example intended to aid in understanding of the data and is not intended to limit the embodiments of the present disclosure. The number of rows of the input data 210 is provided merely as an example, and is not intended to limit the present disclosure.

The input data 210 may be provided to machine learning operation 220. The machine learning operation 220 may generate output data 450. The output data 450 may include forecast values that are predicted by the machine learning operation 220 based on the input data 210. For example, referring to FIG. 4, the output data 450 includes four columns, a timestamp column 452, a forecast value column 454, and columns for lower and upper bounds of a confidence interval 456, 458, respectively. The rows of the output data 450 may portray the results of the forecasting of the machine learning operation 220. For example, the timestamp column 452 may include a number of predicted time periods (e.g., in the future) and the forecast values 454 may predict the values expected for those time periods given the input data 210. The lower 456 and upper 458 bounds of the confidence interval may indicate the range of the confidence interval for the prediction provided by the machine learning operation. For example, if the input data 210 indicated monthly sales volumes, the output data 450 may include predictions for future sales volumes (forecast values 454) at various predicted time periods (timestamp 452) as predicted by the machine learning operation 220 based on the input data 210.

The format of the output data 450 provided in FIG. 4 is merely an example. It will be understood that other formats, as well as other output values, are possible without deviating from the scope of the present disclosure. Similarly, it will be understood that the time series forecasting is only an example of the types of predictions/analyses that may be performed by the machine learning operation 220. Other types of predictions and/or classifications may be performed by the machine learning operation 220 within the scope of the present disclosure.

As discussed herein, in some embodiments, access to the machine learning operation 220 may be performed utilizing standard database operations and/or infrastructure. For example, in some embodiments, the access may be provided by a UDTF.

A UDTF is a programmatically defined object that appears to users of a database to be a conventional table. A UDTF can be based on a query or other appropriate logic and return a two-dimensional array structure as though it were a set of rows and columns, thereby allowing database users to utilize the results of the UDTF as though it were a table. When referenced (or "called"), a UDTF is configured to execute a query that retrieves data from one or more underlying tables, or executes a procedure to generate data, and then provides access to the retrieved data in a similar manner as a database table.

In some embodiments, access to the machine learning operation 220 may be provided as a UDTF. For example, a UDTF of the following format may be provided:

FORECAST(<input_query_ref>, <forecasting_periods>, <confidence_level>)

In the above example, <input_query_ref> refers to a reference to an input query which produces some number of columns. For example, referring to the example provided in FIG. 4, the <input_query_ref> value may refer to a SQL query that returns at least two columns (Timestamp, Value). In some embodiments, Timestamp may include returned timestamps that have consistent intervals between rows, and Value may be the value column upon which to forecast. The input <forecasting_periods> may refer to a number of steps to forecast into the future. The input <confidence_level> may determine what level of confidence (e.g., a minimum level) will be used for the machine learning operation 220. In some embodiments, one or more of the inputs may be optional. For example, if a user does not specify a confidence level, then a default value may be selected (e.g., 0.8/80% confidence).

The UDTF may return a table view that includes, for example, four columns. The four columns may be similar to those illustrated in FIG. 4 (e.g., Timestamp, Forecast Value, Confidence Lower Bound, Confidence Upper Bound), however this format is merely an example. The execution of the UDTF may call the machine learning operation 220, with the provided input values (e.g., <input_query_ref>, <forecasting_periods>, <confidence_level>). The machine learning operation 220 may be executed against the provided input values to generate a table view containing the output values. The returned table view may provide an abstraction into the results of the machine learning operation 220 that provides the caller the ability to manipulate the results in a standard fashion (e.g., using SQL).

An example of how the example FORECAST( ) UDTF may be called is included below:

```
SELECT
    output.ts,
    output.y,
    output.confidence_interval_lb,
    output.confidence_interval_ub
FROM
```

TABLE(FORECAST((select c1 as ts, c2 as y from input_table),100, 0.8))) output;

The above example may result in a command according to standard SQL format that allows for the generation of forecast values based on manipulation of the input data. In the above example a reference to the input data is provided by the SQL select statement "select c1 as ts, c2 as y from input_table" which references data within the database. Thus, the machine learning operation 220 may be performed on data within the database without exporting the data (e.g., in situ analysis). Moreover, the complexity of the machine learning operation 220 may be abstracted from the user utilizing standard SQL operations.

Figure 5:
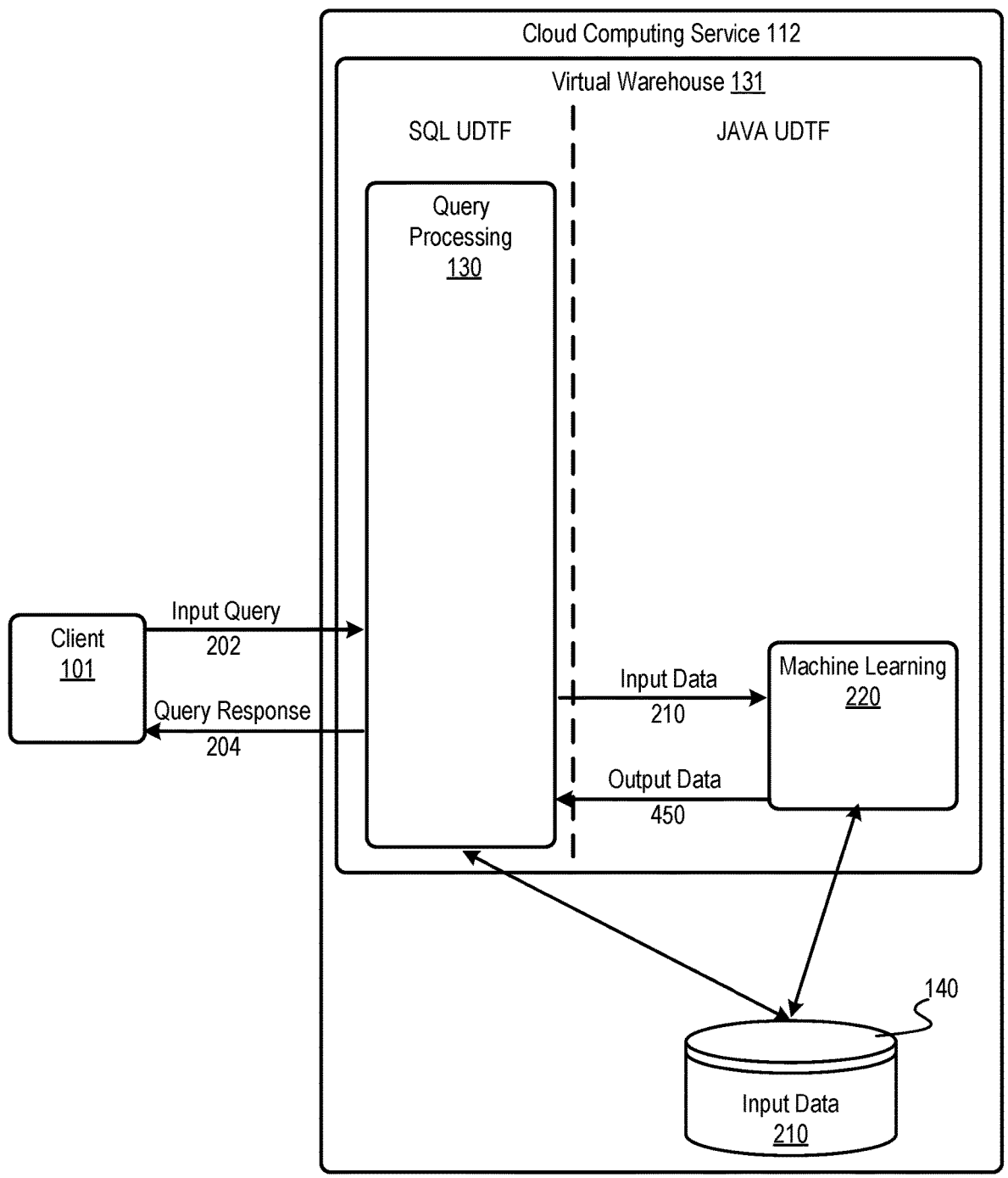
FIG. 5 is a schematic block diagram of an example embodiment of performing a machine learning operation on an input data set utilizing a user-defined table function (UDTF), in accordance with some embodiments of the present disclosure.

FIG. 5 is a schematic block diagram of an example embodiment of performing a machine learning operation on an input data set utilizing a UDTF, in accordance with some embodiments of the present disclosure. As FIG. 5 contains elements that are the same or similar as discussed herein with respect to FIGS. 2A and 2B, a duplicate description thereof will be omitted for brevity.

Referring to FIG. 5, embodiments of the present disclosure may be implemented as part of a virtual warehouse 131 of the query processing component 130 (see FIG. 1). The query processing 130 for some embodiments of the present disclosure may be implemented as a SQL UDTF that is accessed by input query 202 from client device 101. The input query 202 may be, for example, a SQL query or other SQL construct, such as the SQL query examples described herein.

As part of implementing the SQL UDTF, the query processing 130 may execute a JAVA UDTF. The JAVA UDTF may be a UDTF implemented using the JAVA language. In some embodiments, the JAVA UDTF may be executed by one of the compute nodes 132 (see FIG. 1) of the virtual warehouse 131. The SQL UDTF may provide input data 210 (or a reference to input data 210 within data storage 140) to the JAVA UDTF.

The JAVA UDTF may execute the machine learning operation 220. For example, as described herein, the JAVA UDTF may provide the input data 210 to one or more input nodes of a machine learning model (such as machine learning model 302 discussed herein with respect to FIG. 3). The machine learning operation 220 may generate output data 450 in response to the machine learning operation 220. In example embodiments in which the machine learning operation 220 is a time series forecasting operation, the output data 450 may be similar to that illustrated in FIG. 4, though the embodiments of the present disclosure are not limited thereto. In some embodiments, the machine learning operation 220 may be a classification, categorization, and/or prediction operation that is performed based on the input data 210 according to a machine learning model.

The output data 450 may be processed by the SQL UDTF of the query processing 130 and be provided to the client device 101 via the query response 204. In some embodiments, the query response 204 may provide the output data 450 of the machine learning operation 220 to the client device 101 in a standard database format (e.g., as tabular data capable of being accessed and/or manipulated by SQL statements).

Though FIG. 5 illustrates the use of a JAVA UDTF, it will be understood that other types of UDTFs may be utilized without deviating from the present disclosure. For example, in some embodiments, the JAVA UDTF may be replaced with a UDTF implemented in another language, such as PYTHON as merely one example. In some embodiments, the JAVA UDTF may be omitted, and the performing of a machine learning operation may be performed fully by a SQL UDTF.

Though FIG. 5 illustrates the use of a SQL UDTF, it will be understood that other mechanisms within the cloud computing service 112 may be utilized without deviating from the present disclosure. For example, in some embodiments, access to the machine learning operation 220 may be provided by a stored procedure or other type of database command. The stored procedure may access input data (e.g., either passed to or referenced by the call to the stored procedure). Other mechanisms to access the machine learning operation 220 within the scope of the present disclosure will be recognized by those of ordinary skill in the art.

Figure 6:
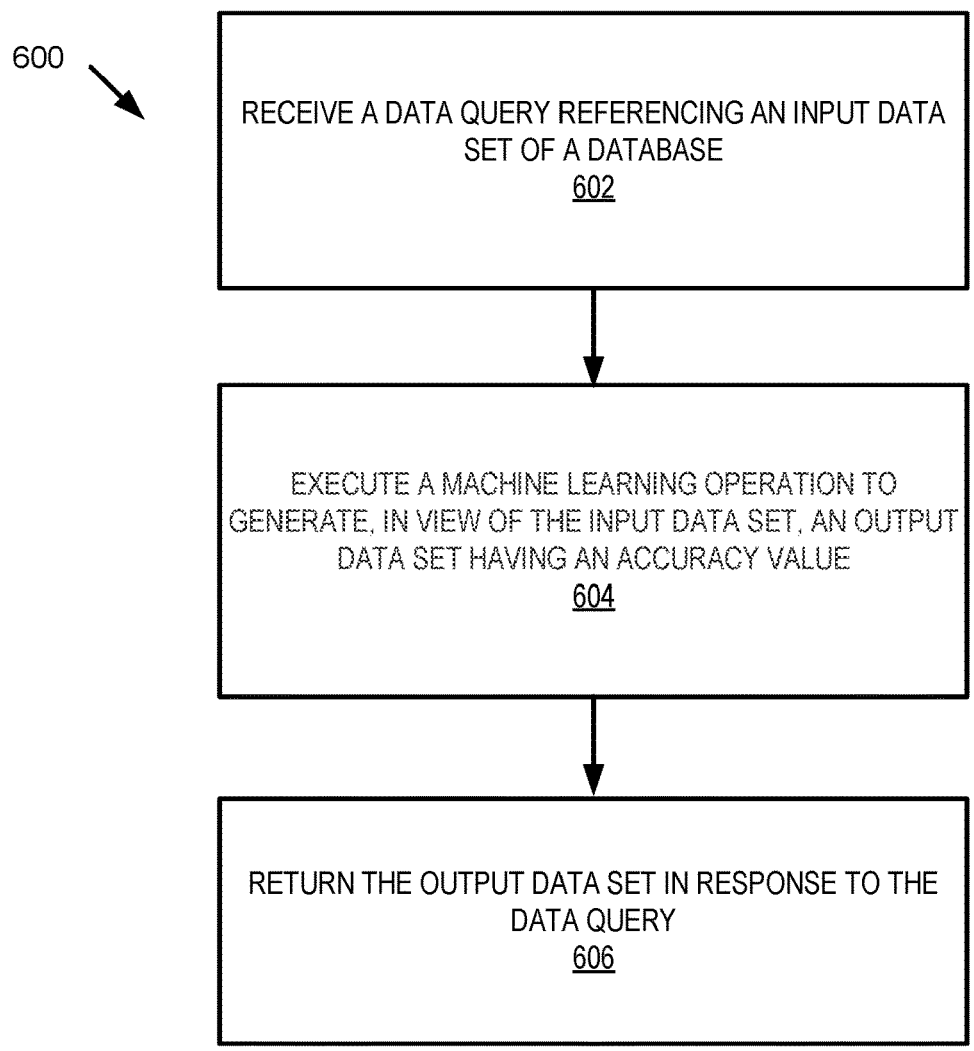
FIG. 6 is a flow diagram of one embodiment of a method to perform a machine learning operation on a data set, in accordance with some embodiments of the present disclosure.

FIG. 6 is a flow diagram of one embodiment of a method 600 to perform a machine learning operation 220 on a data set, in accordance with some embodiments of the present disclosure. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing component 130. Method 600 may begin at step 602, where the processing logic receives a data query referencing an input data set of a database. In some embodiments, the input data set is columnar data or can be extracted or transformed into columnar data. In some embodiments, the data query may incorporate standard SQL elements. For example, in some embodiments, the data query may incorporate a UDTF and/or include a SQL select statement referencing data (e.g., columnar data) of the database.

At step 604, processing logic may execute a machine learning operation to generate, in view of the input data set, an output data set having an accuracy value. In some embodiments, the machine learning operation may be performed against a machine learning model such as machine learning model 302 discussed herein with respect to FIG. 3. The machine learning operation may reference the input data set provided by the data query received at step 602. In some embodiments, the machine learning operation may be performed via a call to a JAVA UDTF from the SQL UDTF. In some embodiments, the JAVA UDTF may return the output data set to the SQL UDTF, which may organize the output data set into a columnar format so that it may be accessed as a table. In some embodiments, the machine learning operation may assign an accuracy value, such as a confident interval, to the output data set. In some embodiments, the accuracy value may be provided as part of the output data set. In some embodiments, the machine learning operation may be a time series forecast operation that predicts output values for a given number of time increments based on time series data provided as part of the input data set.

At step 606, the processing logic returns the output data set in response to the data query. In some embodiments, the output data set may be provided in a format that is or contains standard SQL elements. For example, the output data set may be provided as columnar data that can be accessed via SQL queries (e.g., a SELECT SQL statement). In some embodiments, the output of the machine learning operation may be contained in or referenced by the output data set, such that the output of the machine learning operation can be accessed by way of standard SQL commands.

As described herein, a cloud services platform can provide access to machine learning capability utilizing modifications accessed by standard database mechanisms, such as SQL commands. In some embodiments, the training of the machine learning model (such as machine learning model 302 of FIG. 3) may also be accessed by improvements that may be accessed by standard database mechanisms, such as SQL commands. For example, in some embodiments partitioning functionality of a database may be leveraged to perform parallelized hyperparameter tuning for the machine learning model utilized by the machine learning operations 220.

Figure 7:
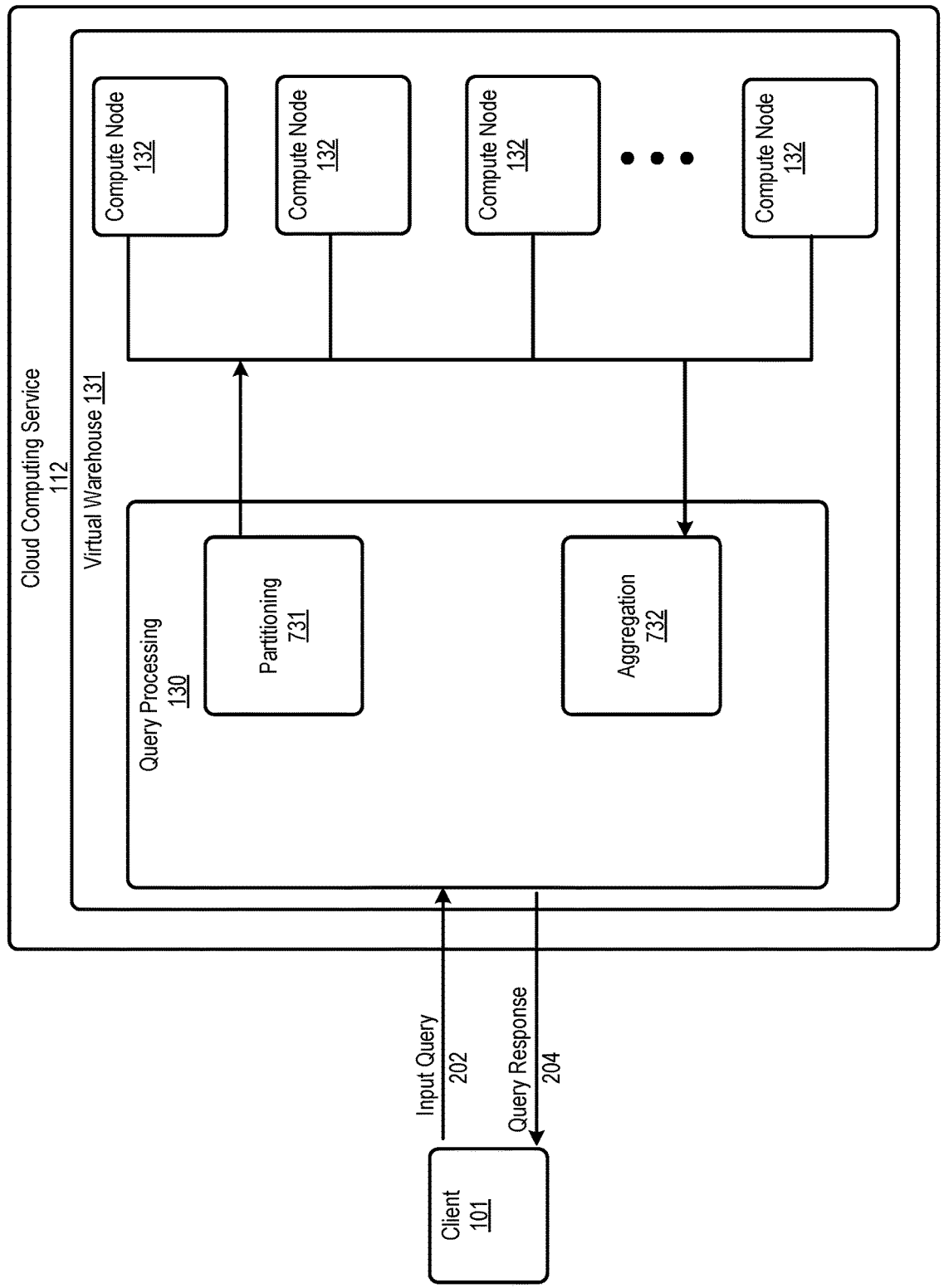
FIG. 7 is a schematic block diagram of an example embodiment of performing partitioning based on an input query, in accordance with some embodiments of the present disclosure.

FIG. 7 is a schematic block diagram of an example embodiment of performing partitioning based on an input query, in accordance with some embodiments of the present disclosure. A duplicate description of elements of FIG. 7 that have been discussed with respect to prior figures will be omitted for brevity. Referring to FIG. 7, query processing 130 of cloud computing service 112 may perform partitioning of input query 202 from client 101. As used herein, partitioning refers to the operation of breaking a particular functionality (e.g., processing of an input query 202) into a plurality of subcomponents that may be executed in parallel. For example, when input query 202 is a SQL query, elements of the SQL query, such as the processing of selects, joins, views, etc. may be separated and executed (e.g., by compute nodes 132 of FIG. 2) and then combined to provide the query response 204.

As shown in FIG. 7, the input query 202 may be processed by partitioning component 731. The partitioning component 731 may break the input query 202 into a plurality of components, each of which may be provided to a separate compute node 132. Each of the compute nodes 132 may execute their respective component of the input query 202. In some embodiments, the compute nodes 132 may execute their respective components concurrently (e.g., in parallel). In some embodiments, the compute nodes 132 may be part of the same virtual warehouse 131 (as illustrated in FIG. 7). However, the embodiments of the present disclosure are not limited to such a configuration. In some embodiments, the compute nodes 132 may be part of different virtual warehouses 131 of the cloud computing service 112.

Output of the plurality of compute nodes 132 may be returned to an aggregation component 732 of the query processing 130. The aggregation component 732 may receive the results and re-combine the various results into the query response 204. That is to say that the various results of the plurality of components of the input query 202 may be executed concurrently, and then collected by the aggregation component 732 and combined into a cohesive result that is provided as part of the query response 204.

By utilizing the partitioning functionality such as that illustrated in FIG. 7, the machine learning operations described herein may be further improved. In some embodiments, machine learning training algorithms may also be executed within the cloud computing service 112. By utilizing the data warehouse mechanisms, such as the UDTF described herein, in conjunction with the partitioning functionality of the data warehouse, machine learning training may be performed in a way that reduces and/or minimizes the data exchange between compute nodes and largely ensures even distribution of work across each of the compute nodes for typical machine learning hyperparameter search workloads, without the need for manually determining the distribution strategy.

Figure 8:
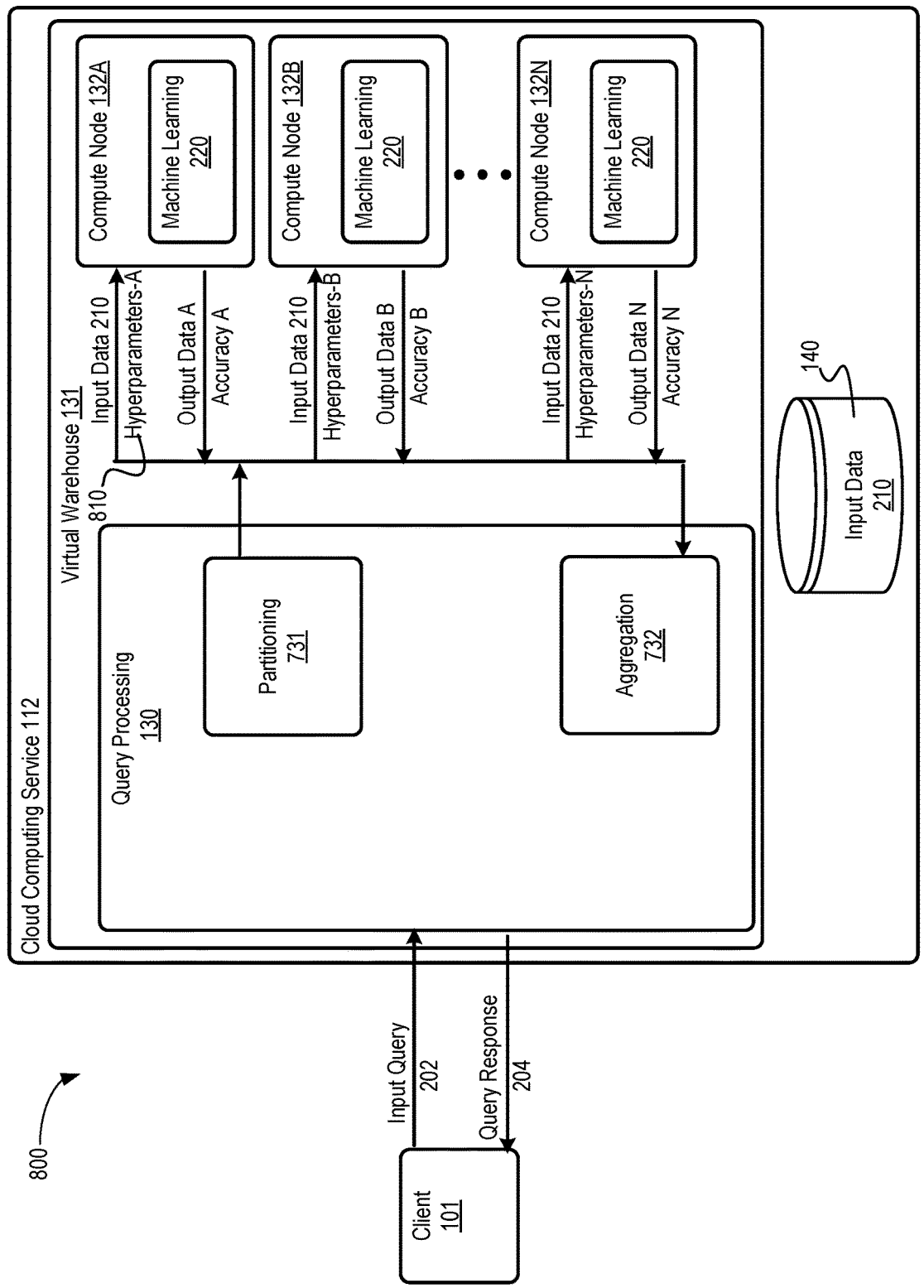
FIG. 8 is a schematic block diagram of an example embodiment of performing distributed hyperparameter tuning based on an input query, in accordance with some embodiments of the present disclosure.

FIG. 8 is a schematic block diagram of an example embodiment of performing distributed hyperparameter tuning based on an input query, in accordance with some embodiments of the present disclosure. Elements of FIG. 8 that have been discussed herein with respect to the prior figures will be omitted for brevity. In FIG. 8, system 800 includes a query processing component 130 of a cloud computing service 112 that receives an input query 202, performs a machine learning operation 220 on input data 210 referenced by the input query 202, and returns query response 204.

In some embodiments, the input data 210 of the input query 202 can be any type of data set including unstructured data, data stored in columns, or data that can be converted into columnar data (e.g., JavaScript Object Notation, key-value data, and/or other types of stored data). In some embodiments, the input query 202 may reference the input data 210 stored in the data storage 140 of the cloud computing service 112, such as within the cloud computing platform 110 described in FIG. 1 above.

In some embodiments, the input query 202 may be a command/request provided by a client device 101. For example, the client device 101 may be a personal computer, laptop, server, tablet, smart phone, and/or another type of device that can process data and/or communicate with the cloud computing service 112. The input query 202 may provide a reference to the input data 210, such as by a SQL query, and may request that the cloud computing service 112 perform the machine learning operation 220 on the input data 210. The results of the machine learning operation 220 may be provided to the client 101 as part of the query response 204.

In the system 800 of FIG. 8, the query processing 130 may perform hyperparameter tuning as part of the machine learning operation 220. As discussed herein, hyperparameter tuning may include the incremental variation of the hyperparameters of a machine learning model (e.g., machine learning model 302). The variation of the hyperparameters may be performed as part of the training of the machine learning model so as to increase its accuracy. Hyperparameters are not typically inferred while fitting the machine learning model to the training set because they refer to the model selection task, or algorithm hyperparameters, that in principle have no/little influence on the accuracy of the model (as opposed to the weights of the various neural network layers) but affect the speed and quality of the learning process. Non-limiting examples of the machine learning hyperparameters include the topology and size of the neural network (e.g., the number of input layers/nodes, the number of hidden layers/nodes, the number of output layers/nodes, a learning rate of the neural network, etc.) Different training algorithms for the machine learning model training algorithms may utilize different hyperparameters. Additional example hyperparameters for time series forecasting algorithms include, but are not limited to, trend, seasonality, and holiday factors of a time series (e.g., whether the trend is linear, polynomial, logarithmic, exponential, etc., the frequency of the seasonality, whether seasonality is additive or multiplicative, whether holiday increments/decrements are present on particular holidays, such as Christmas Day or Thanksgiving Day).

The selection of different hyperparameters may result in a machine learning model, and thus a machine learning operation, that results in a more accurate result for a set of training data. In some embodiments, the input data 210 of the input query 202 may be passed as training data to the machine learning operation 220. The machine learning operation 220 may train the machine learning model (e.g., adjust the weights of the machine learning model) based on the input data 210 so as to develop the machine learning model. Once trained, the machine learning model may be used to generate output data based on the input data, as described herein, along with an accuracy value for the generated output data.

In some embodiments, a particular set of hyperparameters may be provided to the machine learning operation 220 in addition to the input data 210. The machine learning operation 220 may perform the training of the machine learning operation 220 utilizing the provided set of hyperparameters. The machine learning operation 220 may determine that the provided hyperparameters result in a particular accuracy (e.g., a confidence interval) for the resulting predictions of the machine learning operation 220.

In some embodiments, in order to train a number of machine learning models concurrently, the query processing 130 may utilize the partitioning scheme described herein with respect to FIG. 7. For example, the query processing component 130 may provide the input data 210 as training data along with a plurality of different hyperparameter values sets to a plurality of different machine learning operations 220 utilizing data/query partitioning.

For example, referring to FIG. 8, the input query 202 may be partitioned by partitioning component 731. The partitioning component 731 may distribute the input data 210 of the input query 202 as training data to a plurality of compute nodes 132. For each of the plurality of compute nodes 132, the partitioning component 731 may generate a unique combination of hyperparameters 810 to be used by the machine learning operation 220. For example, a set of N unique hyperparameter sets 810 may be generated by the query processing 130. For each of the plurality of hyperparameter sets 810, one of the hyperparameter values may be altered so as to create a plurality of unique hyperparameter combinations 810. The partitioning component 731 may provide the input data 210 and one of the N unique hyperparameter sets 810 to a plurality of machine learning operations 220 executed on one or more compute nodes 132. In some embodiments, the compute nodes 132 may be part of the same virtual warehouse 131 (as illustrated in FIG. 8). However, the embodiments of the present disclosure are not limited to such a configuration. In some embodiments, the compute nodes 132 may be part of different virtual warehouses 131 of the cloud computing service 112.

In some embodiments, the N unique hyperparameter sets 810 may be generated by incrementally altering each possible hyperparameter value of each possible hyperparameter. For example, if one of the possible hyperparameters is the number of hidden layers of the machine learning model, and the number may vary between 1 and 12, twelve sets of hyperparameter values 810 may be generated in which the number of hidden layers is altered for each of the twelve sets (having values that vary from 1 to 12) while the other hyperparameters are kept constant. However, the embodiments of the present disclosure are not limited to this example. In some embodiments, more than one hyperparameter may change between the various sets of hyperparameters 810.

In some embodiments, the sets of hyperparameter values 810 may be selected based on the provided input data. For example, in some embodiments, the input data 210 may be analyzed to determine if particular hyperparameters may be more relevant to the type of data than others. For example, if the machine learning operation 220 to be performed is a time series forecasting operation, then parameters such as the number of hidden layers or the number of input nodes may be modified while other hyperparameters are not modified within the various hyperparameter sets 810. As another example, the input data 210 may be analyzed to determine if there is high data volatility, wide ranges of data, or other data characteristics. These input data characteristics may be utilized to reduce the number of permutations of the hyperparameter values that may be attempted and, as a result, a number of the machine learning operations 220 that are performed.

In some embodiments, different forecasting problem types may result in different machine learning model choices and thus different hyperparameters to be tuned. One non-limiting example of different forecasting problem types is univariate time series forecasting compared with multivariate time series forecasting. For univariate time series (i.e. only one time-dependent variable), the hyperparameters being tuned may focus on trend, seasonality, and holidays. For multivariate time series forecasting (i.e. more than one time dependent variables), the machine learning operation 220 may be neural network based model like a recurrent neural network (RNN), long short-term memory (LSTM), or the like, such that the hyperparameters being tuned may focus on the number of hidden layers, learning rate, etc.

In some embodiments, different types of input data 210 may result in different machine learning model choices and thus different hyperparameters to be tuned. For example, in univariate time series forecasting, from analyzing the data, it may be determined from the input data 210 whether the input data 210 has holiday effects or not. If holiday effects are present, there may be additional hyperparameters to tune (e.g., modifying which holidays have a positive impact on data and which have a negative impact).

As an example, the input data 210 and a first hyperparameter set 810 ("Hyperparameters A") may be provided to a machine learning operation 220 executing on a first compute node 132A. The input data 210 and a second hyperparameter set 810 ("Hyperparameters B") may be provided to a machine learning operation 220 executing on a second compute node 132B. Similar partitioning may be performed for each of N unique hyperparameter sets 810.

The plurality of compute nodes 132 may concurrently execute each of the machine learning operations 220 utilizing their respective hyperparameter set 810. The machine learning operations 220 may utilize the provided input data 210 to both train the underlying machine learning model as well as provide the output from the machine learning operation 220 based on the input data 320. For instance, given a list of time series data and a particular set of hyperparameters 810, the machine learning operation 220 may train a machine learning model utilizing the provided time series data as configured by the set of hyperparameters 810. Once trained, the machine learning model may be used to generate a set of forecasts based on the time series data.

For each of the executed machine learning operations 220, a set of output data may be generated along with an accuracy of the output data (e.g., a confidence interval). As each of the machine learning operations 220 was provided with a different set of hyperparameters 810, each of the machine learning operations 220 executed on the compute nodes 132 may generate a different set of output data and accuracy values. For example, referring to FIG. 8, the first compute node 132A may generate a first output data A and an accuracy value A, the second compute node 132B may generate a second output data B and an accuracy value B, and so on up to the Nth compute node 132N.

The plurality of output data sets and accuracy values may be provided to the aggregation component 732. Of the plurality of output data sets provided, the aggregation component 732 may select at least one to provide as part of the query response 204 (e.g., as output data 450 discussed herein with respect to FIG. 5). In some embodiments, the aggregation component 732 may select the at least one of the plurality of output data sets based on the provided accuracy values. For example, of the N performed machine learning operations 220, the aggregation component 732 may select the output data having the highest accuracy value. In some embodiments, the aggregation component 732 may compare the returned accuracy values to a threshold value. For example, the aggregation component 732 may select the first (in time) output data that is received having an accuracy value that meets or exceeds a threshold value. In some embodiments, the threshold value may be provided as part of the input query 202. In some embodiments, other parameters of the input query 202 or other characteristics of the output data provided by the machine learning operations 220 may be used to select which of the returned output data are included as part of the query response 204.

By joining the input data as training data along with hyperparameter value sets 810, data sources may be created for each hyperparameter training job. If partitioning is performed utilizing sets of hyperparameter values 810, the query processing engine (which may be a SQL execution engine) may automatically create correct partitions for each machine learning training job with a unique combination of hyperparameter values.

Figure 9:
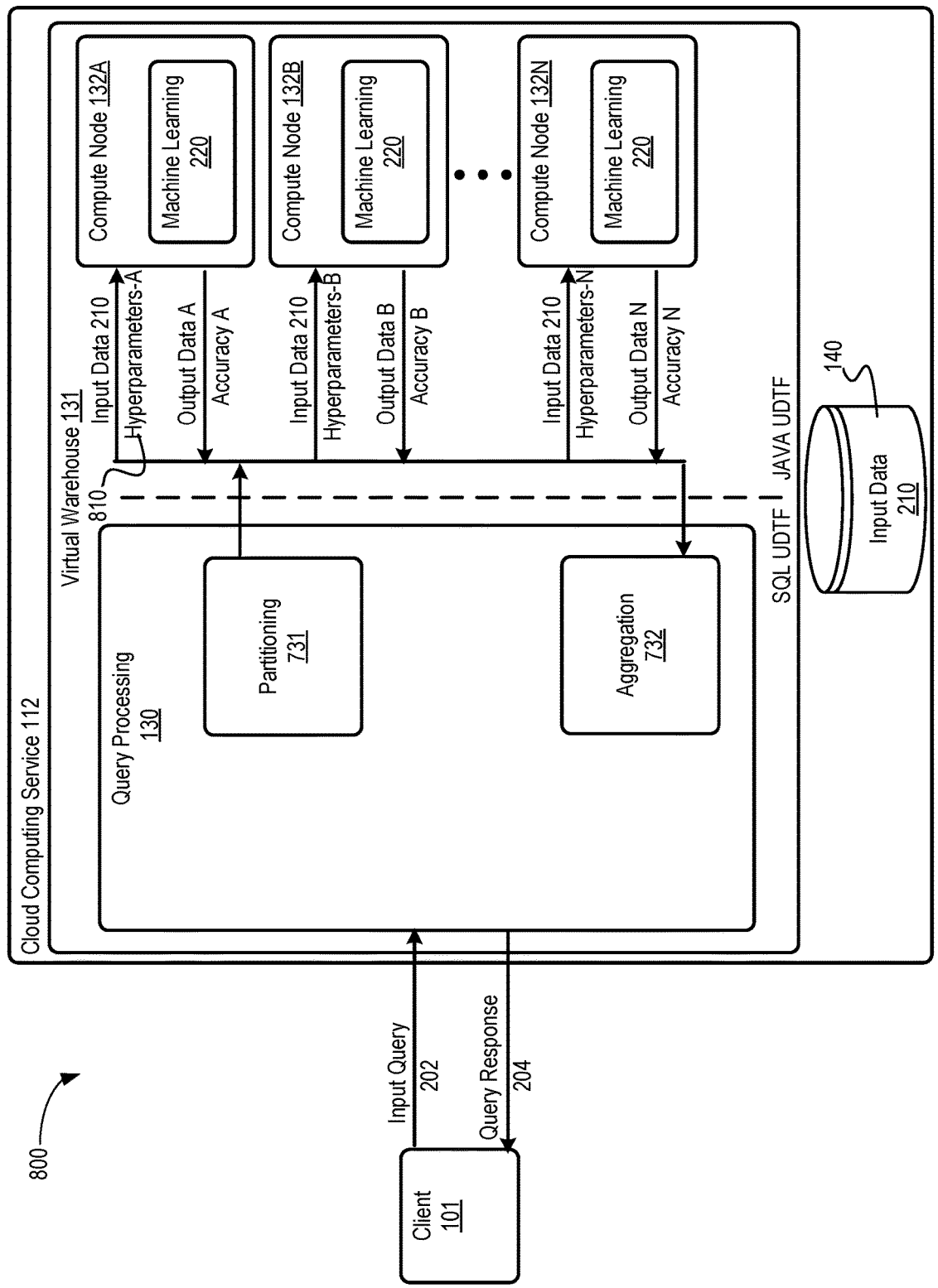
FIG. 9 is a schematic block diagram of an example embodiment of performing distributed hyperparameter tuning utilizing a UDTF, in accordance with some embodiments of the present disclosure.

FIG. 9 is a schematic block diagram of an example embodiment of performing distributed hyperparameter tuning utilizing a UDTF, in accordance with some embodiments of the present disclosure. As FIG. 9 contains elements that are the same or similar as discussed herein with respect to FIG. 8, a duplicate description thereof will be omitted for brevity.

Referring to FIG. 9, embodiments of the present disclosure may be implemented as part of one or more virtual warehouses 131 of the query processing component 130 (see FIG. 1). The query processing 130 for some embodiments of the present disclosure may be implemented as a SQL UDTF that is accessed by input query 202 from client device 101. The input query 202 may be, for example, a SQL query or other SQL construct, such as the SQL query examples described herein.

As part of implementing the SQL UDTF, the partitioning component 731 of the query processing component 130 may execute a JAVA UDTF. The JAVA UDTF may be a UDTF implemented using the JAVA language. The JAVA UDTF may be provided with the input data 210 (or a reference to input data 210 within data storage 140) referenced by the input query 202 as well as a plurality of hyperparameter value sets 810. For each of the plurality of hyperparameter sets 810, one of the hyperparameter values may be altered so as to create a plurality of unique hyperparameter combinations 810. In some embodiments, the JAVA UDTF may execute, or cause to be executed, a machine learning operation 220 for each of the plurality of unique hyperparameter combinations 810. In some embodiments, each of the machine learning operations 220 may be executed by one of the compute nodes 132 of a virtual warehouse 131. In some embodiments, the compute nodes 132 may be part of the same virtual warehouse 131 (as illustrated in FIG. 9). However, the embodiments of the present disclosure are not limited to such a configuration. In some embodiments, the compute nodes 132 may be part of different virtual warehouses 131 of the cloud computing service 112.

Each of the plurality of machine learning operations 220 may be executed according to the provided set of hyperparameters 810. For example, as described herein, the JAVA UDTF may provide the input data 210 to one or more input nodes of a machine learning model (such as machine learning model 302 discussed herein with respect to FIG. 3). The machine learning model may be configured according to the provided set of hyperparameters 810. Thus, the JAVA UDTF may execute a plurality of machine learning operations 220, each operating using a machine learning model that is configured using a different set of hyperparameters 810. Each of the machine learning operations 220 may generate output data in response to the respective machine learning operation 220. Additionally, each of the machine learning operations 220 may provide an accuracy value for the output data (or the accuracy value may be included as part of the output data). In example embodiments in which the machine learning operation 220 is a time series forecasting operation, the output data may be similar to the output data 450 illustrated in FIG. 4, though the embodiments of the present disclosure are not limited thereto. In some embodiments, the machine learning operations 220 may be a classification, categorization, and/or prediction operations that are performed based on the input data 210 according to a machine learning model configured using the various sets of hyperparameters 810.

In some embodiments, the JAVA UDTF may provide each of the respective output data sets that are returned from the plurality of machine learning operations 220 to the SQL UDTF, and the SQL UDTF may select which of the output data sets are to be provided as part of the query response 204 (e.g., based on the returned accuracy result). However, the embodiments of the present disclosure are not limited to this configuration. In some embodiments, the JAVA UDTF may select one output data set from the plurality of output data sets, and provide the selected output data set to the SQL UDTF.

The output data may be processed by the SQL UDTF of the query processing 130 and be provided to the client device 101 via the query response 204. In some embodiments, the query response 204 may provide the output data of the machine learning operation 220 to the client device 101 in a standard database format (e.g., as tabular data capable of being accessed and/or manipulated by SQL statements).

Though FIG. 9 illustrates the use of a JAVA UDTF, it will be understood that other types of UDTFs may be utilized without deviating from the present disclosure. For example, in some embodiments, the JAVA UDTF may be replaced with a UDTF implemented in another language, such as PYTHON as merely one example. In some embodiments, the JAVA UDTF may be omitted, and the distributed hyperparameter tuning may be performed fully by a SQL UDTF.

Though FIG. 9 illustrates the use of a SQL UDTF, it will be understood that other mechanisms within the cloud computing service 112 may be utilized without deviating from the present disclosure. For example, in some embodiments, access to the hyperparameter tuning of the machine learning operation 220 may be provided by a stored procedure or other type of database command. The stored procedure may access input data (e.g., either passed to or referenced by the call to the stored procedure). Other mechanisms to access the hyperparameter tuning of the machine learning operation 220 within the scope of the present disclosure will be recognized by those of ordinary skill in the art.

In some embodiments, the tuning of the hyperparameters for the machine learning operation may be transparent to the client device 101. For example, the client device 101 may access the machine learning operation, such as by using the FORECAST( ) UDTF described herein, and the variations of the hyperparameters to provide the tuned machine learning model may be performed without additional feedback from the client device 101. In some embodiments, an accuracy threshold value (such as the <confidence interval> input value for the FORECAST( ) UDTF discussed herein) may be used to select one of the output sets of the plurality of machine learning operations 220 to select. Thus, the methods and systems described herein allow for the improved tuning of a machine learning operation to automatically provide more accurate results to a client device that may be accessed utilizing standard database queries.

Figure 10:
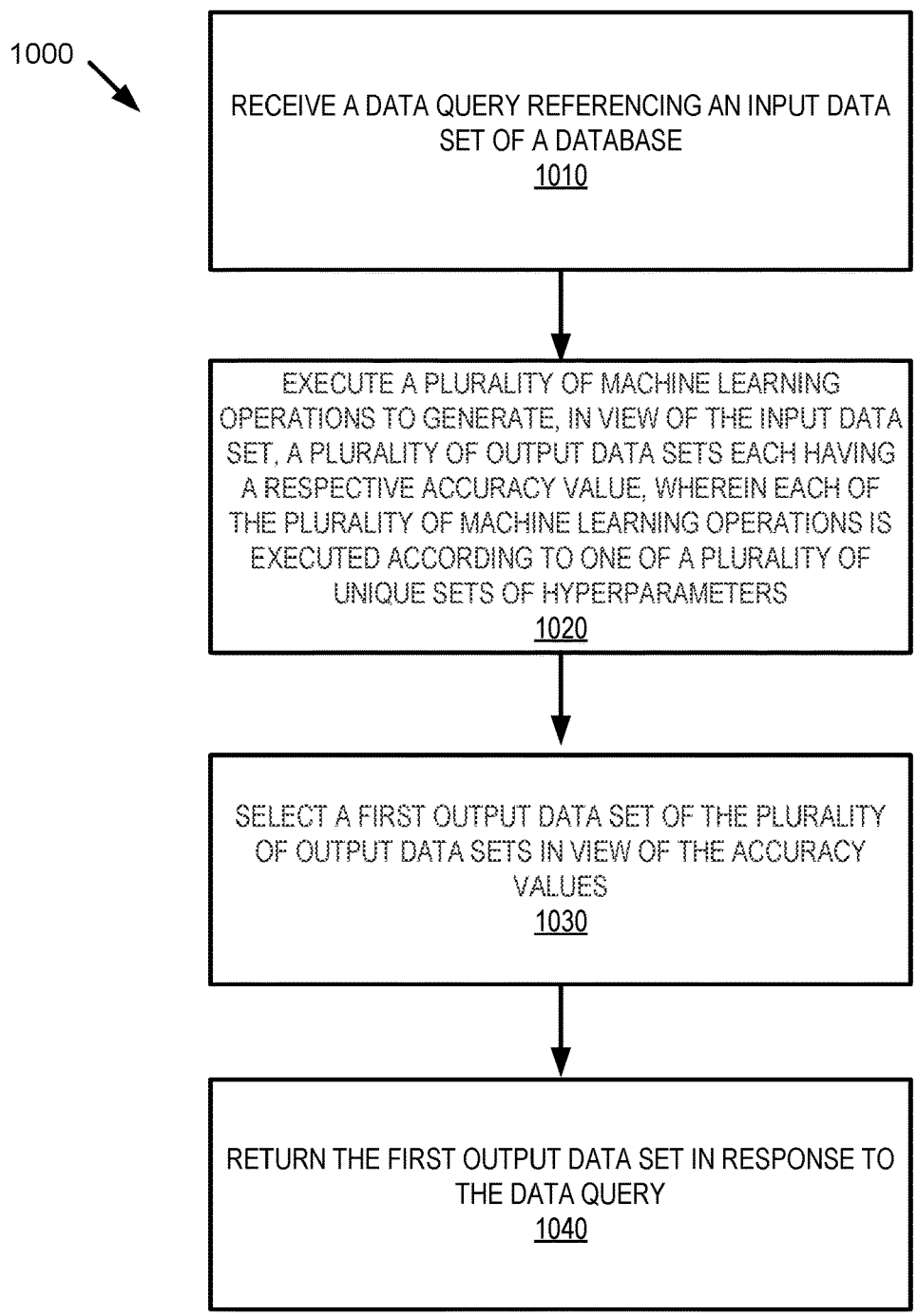
FIG. 10 is a flow diagram of one embodiment of a method to perform hyperparameter tuning of a machine learning operation on a data set, in accordance with some embodiments of the present disclosure.

FIG. 10 is a flow diagram of one embodiment of a method 1000 to perform hyperparameter tuning of a machine learning operation 220 on a data set, in accordance with some embodiments of the present disclosure. In general, the method 1000 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing 130. Method 1000 may begin at step 1010, where the processing logic receives a data query referencing an input data set of a database. In some embodiments, the input data set is columnar data or can be extracted or transformed into columnar data. In some embodiments, the data query may incorporate standard SQL elements. For example, in some embodiments, the data query may incorporate a SQL UDTF and/or include a SQL select statement referencing data (e.g., columnar data) of the database.

At step 1020, processing logic may execute a plurality of machine learning operations to generate, in view of the input data set, a plurality of output data sets each having a respective accuracy value. In some embodiments, each of the plurality of machine learning operations is executed according to one of a plurality of unique sets of hyperparameters. In some embodiments, each of the plurality of machine learning operations may be performed against a machine learning model, such as machine learning model 302 discussed herein with respect to FIG. 3, that is configured using the respective set of hyperparameters. The machine learning operations may reference the input data set provided by the data query received as step 1010. In some embodiments, the machine learning operations may be performed via a call to a JAVA UDTF from a SQL UDTF. In some embodiments, the JAVA UDTF may return the output data set to the SQL UDTF, which may organize the output data set into a columnar format so that it may be accessed as a table. In some embodiments, each of the machine learning operations may assign an accuracy value, such as a confidence interval, to the output data set. In some embodiments, the accuracy value may be provided as part of the output data set. In some embodiments, the machine learning operations may be a time series forecast operation that predicts output values for a given number of time increments based on time series data provided as part of the input data set.

At step 1030, the processing logic selects a first output data set of the plurality of output data sets in view of the accuracy values. In some embodiments, the processing logic may select an output data set of the plurality of returned output data sets that has the highest accuracy value. In some embodiments, the processing logic may select an earliest (e.g., first in time) output data set that it receives that meets or exceeds a threshold for the accuracy value.

At step 1040, the processing logic returns the first output data set in response to the data query. In some embodiments, the first output data set may be provided in a format that is or contains standard SQL elements. For example, the first output data set may be provided as columnar data that can be accessed via SQL queries (e.g., a SELECT SQL statement). In some embodiments, the output of the selected machine learning operation may be contained in or referenced by the first output data set, such that the output of the machine learning operation can be accessed by way of standard SQL commands.

Figure 11:
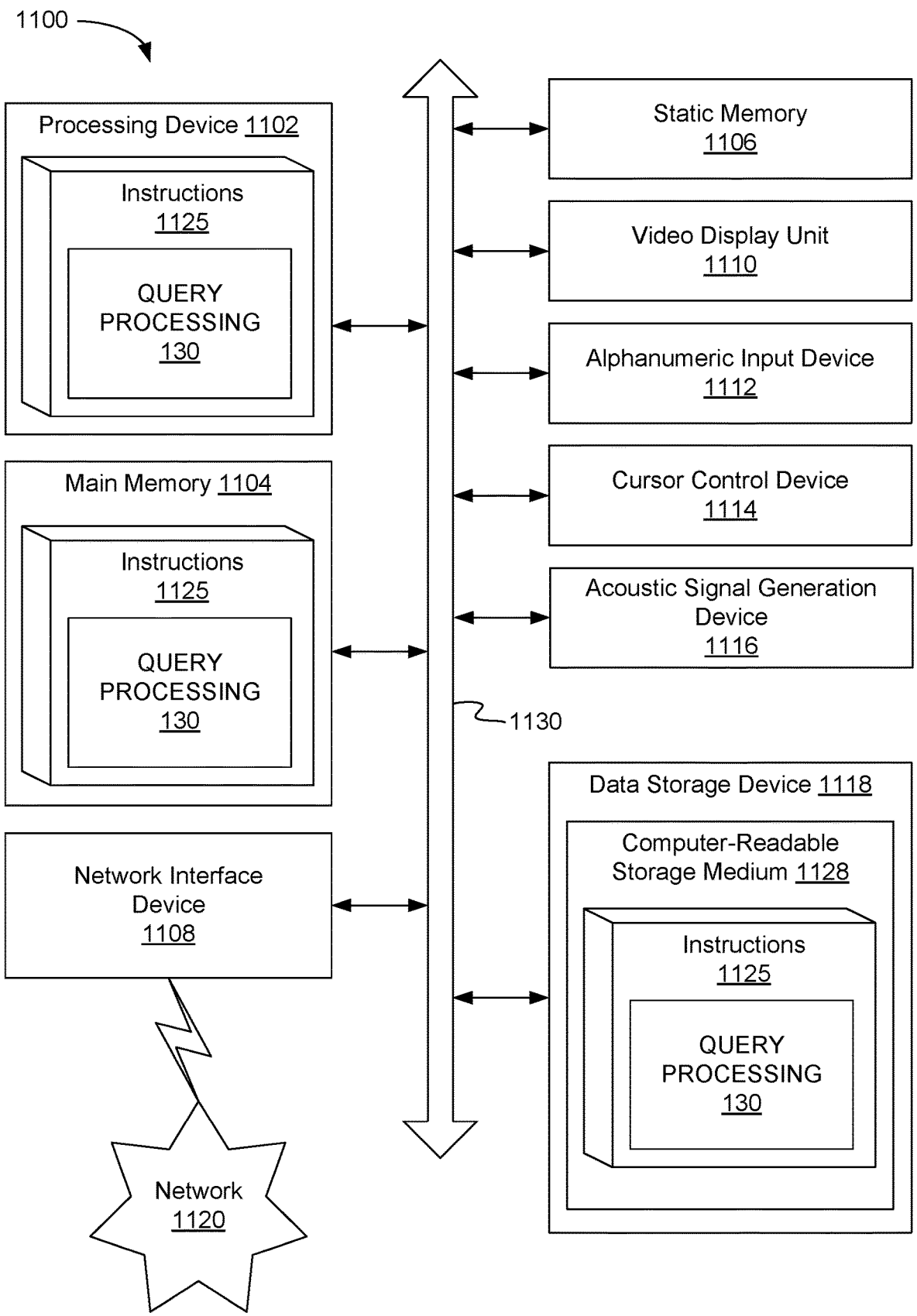
FIG. 11 is a block diagram of an example computing device that may perform one or more of the operations described herein, in accordance with some embodiments of the present disclosure.

FIG. 11 is a block diagram of an example computing device 1100 that may perform one or more of the operations described herein, in accordance with some embodiments. Computing device 1100 may be connected to other computing devices in a LAN, an intranet, an extranet, and/or the internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1100 may include a processing device (e.g., a general purpose processor, a PLD, etc.) 1102, a main memory 1104 (e.g., synchronous dynamic random access memory (DRAM), read-only memory (ROM)), a static memory 1406 (e.g., flash memory) and a data storage device 1118, which may communicate with each other via a bus 1130.

Processing device 1102 may be provided by one or more general-purpose processing devices such as a microprocessor, central processing unit, or the like. In an illustrative example, processing device 1102 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1102 may also comprise one or more special-purpose processing devices such as an application specific integrated circuit (ASIC), a field programmable gate array (FPGA), a digital signal processor (DSP), network processor, or the like. The processing device 1102 may be configured to execute the operations described herein, in accordance with one or more aspects of the present disclosure, for performing the operations and steps discussed herein. In one embodiment, processing device 1102 represents a processing device of cloud computing platform 110 of FIG. 1.

Computing device 1100 may further include a network interface device 1108 which may communicate with a network 1120. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse) and an acoustic signal generation device 1116 (e.g., a speaker). In one embodiment, video display unit 1110, alphanumeric input device 1112, and cursor control device 1114 may be combined into a single component or device (e.g., an LCD touch screen).

Data storage device 1118 may include a computer-readable (also referred to herein as machine-readable) storage medium 1128 on which may be stored one or more sets of instructions 1125, such as instructions for executing the query processing component 130, e.g., instructions for carrying out the operations described herein, in accordance with one or more aspects of the present disclosure. Query processing instructions 130 may also reside, completely or at least partially, within main memory 1104 and/or within processing device 1102 during execution thereof by computing device 1100, the main memory 1104 and processing device 1102 also constituting computer-readable media. The instructions 1125 may further be transmitted or received over a network 1120 via network interface device 1108.

While computer-readable storage medium 1128 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "executing," "selecting," "determining," "returning," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving a data query comprising a reference to an input data set of a database;
   generating, by a processing device, a plurality of unique sets of hyperparameters by varying a hyperparameter value of each set of hyperparameters of the plurality of unique sets of hyperparameters based on the input data set;
   in response to receiving the data query, training a plurality of machine learning models using the input data set of the data query, each of the plurality of machine learning models configured according to a respective one of a plurality of unique sets of hyperparameters;
   selecting a first machine learning model of the plurality of machine learning models based on an accuracy of an output of the first machine learning model; and
   returning the output of the first machine learning model in response to the data query.

2. The method of claim 1, wherein generating the plurality of unique sets of hyperparameters comprises varying the hyperparameter value of each set of the hyperparameters of the plurality of unique sets of hyperparameters based on at least one of a volatility or a range of the input data set.

3. The method of claim 2, wherein the plurality of unique sets of hyperparameters comprise one or more of a trend factor, a seasonality factor, or holiday factors.

4. The method of claim 1, wherein the training of the plurality of machine learning models is performed concurrently on a plurality of compute nodes.

5. The method of claim 1, wherein each of the plurality of machine learning models are trained to perform a time series forecasting operation on the input data set.

6. The method of claim 1, wherein selecting the first machine learning model of the plurality of machine learning models based on the accuracy of an output of the first machine learning model comprises comparing accuracy values of respective output data sets of each of the plurality of machine learning models to select the first machine learning model having a highest accuracy value.

7. The method of claim 6, wherein respective ones of the accuracy values comprise a confidence interval of the output data set.

8. A system comprising:
a memory; and
a processing device, operatively coupled to the memory, to:
receive a data query comprising a reference to an input data set of a database;
generate a plurality of unique sets of hyperparameters by varying a hyperparameter value of each set of hyperparameters of the plurality of unique sets of hyperparameters based on the input data set;
in response to receiving the data query, train a plurality of machine learning models using the input data set of the data query, each of the plurality of machine learning models configured according to a respective one of a plurality of unique sets of hyperparameters;
select a first machine learning model of the plurality of machine learning models based on an accuracy of an output of the first machine learning model; and
return the output of the first machine learning model in response to the data query.

9. The system of claim 8, wherein, to generate the plurality of unique sets of hyperparameters, the processing device is to vary the hyperparameter value of each set of the hyperparameters of the plurality of unique sets of hyperparameters based on at least one of a volatility or a range of the input data set.

10. The system of claim 9, wherein the plurality of unique sets of hyperparameters comprise one or more of a trend factor, a seasonality factor, or holiday factors.

11. The system of claim 8, wherein the processing device is to train the plurality of machine learning models concurrently on a plurality of compute nodes.

12. The system of claim 8, wherein the processing device is to train each of the plurality of machine learning models to perform a time series forecasting operation on the input data set.

13. The system of claim 8, wherein, to select the first machine learning model of the plurality of machine learning models based on the accuracy of an output of the first machine learning model, the processing device is to compare accuracy values of respective output data sets of each of the plurality of machine learning models to select the first machine learning model having a highest accuracy value.

14. The system of claim 13, wherein respective ones of the accuracy values comprise a confidence interval of the output data set.

15. A non-transitory computer-readable storage medium including instructions that, when executed by a processing device, cause the processing device to:
receive a data query comprising a reference to an input data set of a database;
generate, by the processing device, a plurality of unique sets of hyperparameters by varying a hyperparameter value of each set of hyperparameters of the plurality of unique sets of hyperparameters based on the input data set;
in response to receiving the data query, train a plurality of machine learning models using the input data set of the data query, each of the plurality of machine learning models configured according to a respective one of a plurality of unique sets of hyperparameters;
select a first machine learning model of the plurality of machine learning models based on an accuracy of an output of the first machine learning model; and
return the output of the first machine learning model in response to the data query.

16. The non-transitory computer-readable storage medium of claim 15, wherein, to generate the plurality of unique sets of hyperparameters, the processing device is to vary the hyperparameter value of each set of the hyperparameters of the plurality of unique sets of hyperparameters based on at least one of a volatility or a range of the input data set.

17. The non-transitory computer-readable storage medium of claim 16, wherein the plurality of unique sets of hyperparameters comprise one or more of a trend factor, a seasonality factor, or holiday factors.

18. The non-transitory computer-readable storage medium of claim 15, wherein the processing device is to train the plurality of machine learning models concurrently on a plurality of compute nodes.

19. The non-transitory computer-readable storage medium of claim 15, wherein the processing device is to train each of the plurality of machine learning models to perform a time series forecasting operation on the input data set.

20. The non-transitory computer-readable storage medium of claim 15, wherein, to select the first machine learning model of the plurality of machine learning models based on the accuracy of an output of the first machine learning model, the processing device is to compare accuracy values of respective output data sets of each of the plurality of machine learning models to select the first machine learning model having a highest accuracy value.

* * * * *